United States Patent
Shin et al.

(10) Patent No.: US 9,325,391 B2
(45) Date of Patent: Apr. 26, 2016

(54) METHOD AND SYSTEM FOR RELAYING DATA USING A PLURALITY OF RELAY NODES

(71) Applicant: SAMSUNG ELECTRONICS CO., LTD., Suwon-si (KR)

(72) Inventors: Won Jae Shin, Seoul (KR); Chang Yong Shin, Seoul (KR); Kwang Hoon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 278 days.

(21) Appl. No.: 13/974,117

(22) Filed: Aug. 23, 2013

(65) Prior Publication Data

US 2014/0146684 A1 May 29, 2014

(30) Foreign Application Priority Data

Nov. 26, 2012 (KR) .......................... 10-2012-0134255

(51) Int. Cl.
  *H04B 7/02* (2006.01)
  *H04B 7/04* (2006.01)
  *H04B 7/155* (2006.01)

(52) U.S. Cl.
  CPC .............. *H04B 7/026* (2013.01); *H04B 7/0413* (2013.01); *H04B 7/1555* (2013.01)

(58) Field of Classification Search
  None
  See application file for complete search history.

(56) References Cited

U.S. PATENT DOCUMENTS

| | | | |
|---|---|---|---|
| 2006/0056338 A1* | 3/2006 | Abe et al. | 370/328 |
| 2007/0129008 A1 | 6/2007 | Shi et al. | |
| 2010/0214964 A1 | 8/2010 | Larsson et al. | |
| 2011/0223867 A1* | 9/2011 | Chae et al. | 455/63.1 |
| 2011/0319092 A1 | 12/2011 | Kim et al. | |
| 2012/0044815 A1 | 2/2012 | Geirhofer et al. | |
| 2012/0044830 A1* | 2/2012 | Kim et al. | 370/252 |
| 2013/0034129 A1* | 2/2013 | Coldrey et al. | 375/211 |

FOREIGN PATENT DOCUMENTS

| | | |
|---|---|---|
| EP | 1 523 112 A1 | 4/2005 |
| KR | 10-2006-0058852 | 6/2006 |
| KR | 10-2009-0058962 | 6/2009 |
| KR | 10-0984737 | 10/2010 |
| KR | 10-2011-0020352 | 3/2011 |
| KR | 10-2011-0051581 | 5/2011 |
| KR | 10-2011-0103067 | 9/2011 |
| KR | 10-2012-0014792 | 2/2012 |
| KR | 10-2012-0047337 | 5/2012 |

OTHER PUBLICATIONS

International Search Report issued Sep. 26, 2013 in counterpart International Patent Application No. PCT/KR2013/004470 (4 pages).

* cited by examiner

*Primary Examiner* — Awet Haile
(74) *Attorney, Agent, or Firm* — NSIP Law

(57) ABSTRACT

Provided is a method and system for relaying data using a plurality of relay nodes. The method may include obtaining a first channel matrix related to a first-hop channel and a second channel matrix related to a second-hop channel, generating an effective interference channel matrix based on the first channel matrix and the second channel matrix, and calculating a null space vector of the effective interference channel matrix.

20 Claims, 5 Drawing Sheets

METHOD AND SYSTEM FOR RELAYING DATA USING A PLURALITY OF RELAY NODES

CROSS-REFERENCE TO RELATED APPLICATION(S)

This application claims the benefit under 35 USC §119(a) of Korean Patent Application No. 10-2012-0134255, filed on Nov. 26, 2012, in the Korean Intellectual Property Office, the entire disclosure of which is incorporated herein by reference for all purposes.

BACKGROUND

1. Field

The following description relates to a method and system for relaying data over a multi-user multi-hop multiple-input multiple-output (MIMO) network.

2. Description of Related Art

It is estimated that about one percent of all devices currently existing around the world are connected through a network. Typically, a communication system is used as a means of connecting one person to another person. Ericsson, one of the largest companies providing network communication devices, predicts that about 5 billion devices will be connected to each other through the Web by the year 2020. These devices include terminals, smart phones, sensors, appliances, and the like.

In addition, a large number of smart phone users tend to utilize a variety of applications for sharing contents, synchronization, output, games, and the like more readily through direct connection between devices. In order to respond to the increasing demand due to such a market change, it is important to develop wireless access technology that supports direct connection between devices. For example, a wireless access technology overtaking cellular communication using an existing infrastructure, is increasing.

Such a market atmosphere is reflected in recent discussions on device-to-device (D2D) communication standards organized by standardization groups for next generation mobile communication systems. For example, the standardization groups include the third Generation Partnership Project (3GPP) Long Term Evolution-Advanced (LTE-A), the Institute of Electrical and Electronics Engineers (IEEE) 802.16, and the like.

One of the earliest D2D communication schemes employs a transmission scheme in which a single hop is assumed. However, a future D2D communication may utilize a plurality of hops. In addition, in most relay technologies to date, a plurality of relay nodes have been used for obtaining a diversity gain or a multiplexing gain on the assumption that a single source node and a single destination node are provided.

However, going forward, signals may be transmitted by a plurality of source-destination pairs, simultaneously, over a multiple unicast multi-hop network.

SUMMARY

In an aspect, there is provided a method of relaying data among a plurality of node pairs using a plurality of relay nodes, the method including obtaining a first channel matrix between antennas included in a plurality of source nodes and antennas included in the plurality of relay nodes, obtaining a second channel matrix between the antennas included in the plurality of relay nodes and antennas included in a plurality of destination nodes, generating an effective interference channel matrix based on the first channel matrix and the second channel matrix, and calculating at least one null space vector included in a null space of the effective interference channel matrix where the null space vector is not a zero vector.

The method may further comprise obtaining a set of beamforming vectors to be used by the plurality of source nodes, wherein the generating comprises calculating the effective interference channel matrix based on the first channel matrix, the second channel matrix, and the set of the beamforming vectors.

The effective interference channel matrix may comprise effective channels between antennas of a first source node and antennas of remaining destination nodes that are not part of the node pair of the first source node.

The effective interference channel matrix may comprise an effective channel associated with a data transmission path from each antenna of a first source node through each antenna of the plurality of relay nodes to each antenna of remaining destination nodes that are not part of the node pair of the first source node.

The method may further comprise generating a beamforming matrix for the plurality of relay nodes based on the at least one null space vector.

The generating may comprise obtaining an interference pair comprising a source node and a destination node that are excluded from the plurality of node pairs, transposing a channel matrix between antennas of the source node included in the interference pair and antennas of one of the plurality of relay nodes, and calculating a Kronecker product of the transposed channel matrix and a channel matrix between the antennas of one of the plurality of relay nodes and antennas of the destination node included in the interference pair.

The generating may comprise obtaining an interference pair comprising a source node and a destination node that are excluded from the plurality of node pairs, multiplying a channel matrix between antennas of the source node included in the interference pair and antennas of one of the plurality of relay nodes by a beamforming vector to be used by the source node included in the interference pair, transposing the multiplied channel matrix, and calculating a Kronecker product of the transposed channel matrix and a channel matrix between the antennas of one of the plurality of relay nodes and antennas of the destination node included in the interference pair.

A first source node may be configured to precode the data based on a predetermined precoding scheme using multiple antennas, and a first destination node may be configured to combine the data based on an interference cancellation scheme corresponding to the predetermined precoding scheme.

The plurality of relay nodes may comprise a first relay node and a second relay node, and a number of antennas included in the first relay node may differ from a number of antennas included in the second relay node.

The plurality of source nodes may comprise a first source node and a second source node, and a length of a data stream to be transmitted by the first source node may differ from a length of a data stream to be transmitted by the second source node.

The method may further comprise obtaining a total length of data streams that are to be transmitted by the plurality of source nodes, and calculating a total number of antennas included in the plurality of relay nodes that are to be used for calculating the null space vector, based on the total length of the data streams.

The method may further comprise obtaining a total number of antennas included in the plurality of relay nodes, and calculating, based on the total number of the antennas, a total length of data streams to be transmitted by the plurality of source nodes to calculate the null space vector.

In an aspect, there is provided a non-transitory computer-readable medium comprising a program for instructing a computer to perform the method.

In an aspect, there is provided an apparatus for relaying data among a plurality of node pairs using a plurality of relay nodes, the apparatus including a channel matrix obtaining unit configured to obtain a first channel matrix between antennas included in a plurality of source nodes and antennas included in the plurality of relay nodes, and to obtain a second channel matrix between the antennas included in the plurality of relay nodes and antennas included in a plurality of destination nodes, an effective interference channel matrix generating unit configured to generate an effective interference channel matrix based on the first channel matrix and the second channel matrix, and a null space vector calculating unit configured to calculate a null space vector included in a null space of the effective interference channel matrix where the null space vector is not a zero vector.

The apparatus may further comprise a beamforming vector set obtaining unit configured to obtain a set of beamforming vectors to be used by the plurality of source nodes, wherein the effective interference channel matrix generating unit is configured to calculate the effective interference channel matrix based on the first channel matrix, the second channel matrix, and the set of the beamforming vectors.

The apparatus may further comprise a beamforming matrix generating unit configured to generate a beamforming matrix for the plurality of relay nodes based on the null space vector.

The effective interference channel matrix generating unit may comprise an interference pair obtaining unit configured to obtain an interference pair of a source node and a destination node that are excluded from the plurality of node pairs, and a matrix operation unit configured to transpose a channel matrix between antennas of the source node included in the interference pair and antennas of one of the plurality of relay nodes, and to calculate a Kronecker product of the transposed channel matrix and a channel matrix between the antennas of the one of the plurality of relay nodes and antennas of the destination node included in the interference pair.

The effective interference channel matrix generating unit may comprise an interference pair obtaining unit configured to obtain an interference pair of a source node and a destination node that are excluded from the plurality of node pairs, and a matrix operation unit configured to multiply a channel matrix between antennas of the source node included in the interference pair and antennas of one of the plurality of relay nodes by a beamforming vector to be used by the source node included in the interference pair, to transpose the multiplied channel matrix, and to calculate a Kronecker product of the transposed channel matrix and a channel matrix between the antennas of one of the plurality of relay nodes and antennas of the destination node included in the interference pair.

The first source node may be configured to precode the data based on a predetermined precoding scheme using multiple antennas, and the first destination node may be configured to combine the data based on an interference cancellation scheme corresponding to the predetermined precoding scheme.

The plurality of relay nodes may comprise a first relay node and a second relay node, and a number of antennas included in the first relay node may differ from a number of antennas included in the second relay node, and the plurality of source nodes may comprise a first source node and a second source node, and a length of a data stream to be transmitted by the first source node may differ from a length of a data stream to be transmitted by the second source node.

Other features and aspects will be apparent from the following detailed description, the drawings, and the claims.

BRIEF DESCRIPTION OF THE DRAWINGS

FIGS. 2 through 3B are diagrams illustrating examples of a method of relaying data among a plurality of node pairs using a plurality of relay nodes.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

Example of Multi-user Multi-hop Multiple-input Multiple-output (MIMO) Network

Figure 1:
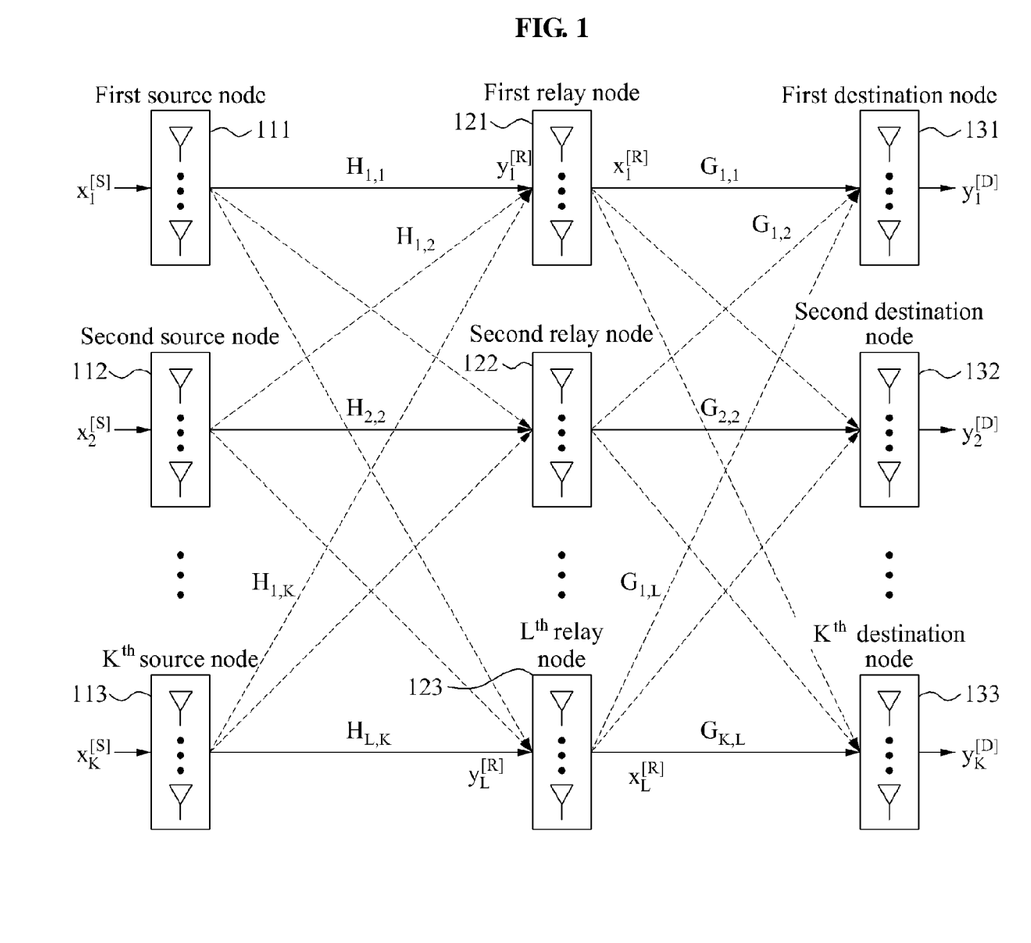
FIG. 1 is a diagram illustrating an example of a multi-user multi-hop multiple-input multiple-output (MIMO) network.

FIG. 1 illustrates an example of a multi-user multi-hop MIMO network.

Referring to FIG. 1, the multi-user multi-hop MIMO network, hereinafter, referred to as the network, includes a plurality of source nodes 111, 112, through 113, a plurality of relay nodes 121, 122, through 123, and a plurality of destination nodes 131, 132, through 133. For example, the network may include K source nodes including the plurality of source nodes 111, 112, through 113, L relay nodes including the plurality of relay nodes 121, 122, through 123, and K destination nodes including the plurality of destination nodes 131, 132, through 133, where K and L are natural numbers.

In this example, each node may include one or more antennas. For example, both a source node and a destination node may include M antennas, respectively, where M is a natural number. An $i^{th}$ relay node may include an Ni number of antennas. It should also be appreciated that a number of antennas included in a first relay node may differ from a number of antennas included in a second relay node.

Here, the plurality of source nodes 111, 112, through 113 may form node pairs with the plurality of destination nodes 131, 132, through 133, respectively. If the first source node 111 desires to transmit data to the first destination node 131, the first source node 111 and the first destination node 131 may form a node pair. For example, the first source node 111 may desire to transmit data to the first destination node 131, the second source node 112 may desire to transmit data to the second destination node 132, and the $K^{th}$ source node 113 may desire to transmit data to the $K^{th}$ destination node 133. In this example, the first source node 111 and the first destination node 131 may form a node pair, the second source node 112 and the second destination node 132 may form a node pair, and the $K^{th}$ source node 113 and the $K^{th}$ destination node 133 may form a node pair.

The first source node 111 may transmit data to the first destination node 131 through one or more of the L relay nodes 121, 122, through 123. Similarly, the second source node 112 may transmit data to the second destination node 132 through one or more of the L relay nodes 121, 122, through 123, and the $K^{th}$ source node 113 may transmit the data to the $K^{th}$ destination node 133 through one or more of the L relay nodes 121, 122, through 123.

A channel between antennas included in each source node and antennas included in each of the relay nodes is referred to as a first-hop channel, and may be expressed by a first channel matrix. For example, referring to Equation 1, the first channel matrix may correspond to a matrix of a size $$\sum_{j=1}^{L} N_j \times MK.$$

$$\underbrace{\begin{bmatrix} H_{1,1} & H_{1,2} & \cdots & H_{1,K} \\ H_{2,1} & H_{2,2} & & H_{2,K} \\ \vdots & \vdots & \vdots & \vdots \\ H_{L,1} & H_{L,2} & \cdots & H_{L,K} \end{bmatrix}}_{\sum_{j=1}^{L} N_j \times MK} \quad \text{[Equation 1]}$$

As an example, a reception signal vector to be received by the $i^{th}$ relay node through the first-hop channel may be expressed by Equation 2.

$$y_l^{[R]} = \sum_{i=1}^{K} H_{l,i} x_i^{[s]} + z_l \quad \text{[Equation 2]}$$

In Equation 2, $y_l^{[R]}$, $l \in \{1, 2, \ldots, L\}$ denotes a channel output vector of a size of $N_l \times 1$, and $H_{l,i}$ denotes a channel matrix of a size of $N_l \times M$ from an $i^{th}$ source node to an $l^{th}$ relay node. $z_l$ denotes a noise vector to be received by the $l^{th}$ relay node.

The $i^{th}$ relay node may generate a new transmission signal $x_l^{[R]}$, based on the received $y_l^{[R]}$. The new transmission signal $x_l^{[R]}$ generated by the $i^{th}$ relay node may be expressed by Equation 3.

$$x_l^{[R]} = W_l y_l^{[R]} \quad \text{[Equation 3]}$$

In Equation 3, $W_l$ denotes a relay beamforming matrix that has a size of $N_l \times N_l$ for the $l^{th}$ relay node.

A channel between antennas included in each relay node and antennas included in each destination node is referred to as a second-hop channel, and may be expressed by a second channel matrix. For example, referring to Equation 4, the second channel matrix may correspond to a matrix of a size of $$MK \times \sum_{j=1}^{L} N_j.$$

$$\underbrace{\begin{bmatrix} G_{1,1} & G_{1,2} & \cdots & G_{1,L} \\ G_{2,1} & G_{2,2} & & G_{2,L} \\ \vdots & \vdots & \vdots & \vdots \\ G_{K,1} & G_{K,2} & \cdots & G_{K,L} \end{bmatrix}}_{MK \times \sum_{j=1}^{L} N_j} \quad \text{[Equation 4]}$$

For example, a reception signal vector to be received by a $j^{th}$ destination node through the second-hop channel may be expressed by Equation 5.

$$y_j^{[D]} = \sum_{l=1}^{L} G_{j,l} x_l^{[R]} + n_j \quad \text{[Equation 5]}$$

In Equation 5, $G_{j,l}$ denotes a channel matrix that has a size of $M \times N_l$ from the $l^{th}$ relay node to the $j^{th}$ destination node, and $n_j$ denotes a noise vector that is to be received by the $j^{th}$ destination node.

Hereinafter, examples of an operation of each node of the plurality of source nodes, the plurality of relay nodes, and the plurality of destination nodes are described.

Example of Transmission Scheme of Plurality of Source Nodes

A source node may precode data based on a predetermined precoding scheme using multiple antennas. In addition, the source node may not use channel feedback information. The predetermined precoding scheme used by the source node may include a variety of wireless communication schemes using multiple antennas. For example, the source node may employ a random beamforming scheme, a Vertical-Bell Laboratories Layered Space-Time (V-BLAST) scheme, and the like. When the V-BLAST scheme is used, the source node may map messages to a plurality of antennas, respectively.

In this instance, a transmission signal to be precoded by the source node may be expressed by Equation 6.

$$x_i^{[S]} = V^{[i]} s^{[i]} = \sum_{m=1}^{d_i} v_m^{[i]} s_m^{[i]} \quad \text{[Equation 6]}$$

In Equation 6, $s^{[i]}$ denotes a total of a $d_i$ number of data symbols that are to be transmitted by the $i^{th}$ source node, and $V^{[i]}$ denotes a beamforming vector that may be used for precoding a corresponding data symbol. In this example, a length $d_1$ of a data stream to be transmitted by the first source node may differ from a length $d_2$ of a data stream to be transmitted by the second source node.

Example of Relay Scheme of Plurality of Relay Nodes

A relay node may use a relay beamforming matrix in which the first-hop channel and the second-hop channel are both considered simultaneously. Accordingly, a destination node, for example, the first destination node, may be free from interference that may be caused by signals transmitted by remaining source nodes, other than a source node, for example, the first source node that is included in a node pair of the corresponding destination node. Here, the relay node may perform linear beamforming.

A reception signal to be received by an $i^{th}$ destination node may be expressed by Equation 7.

$$\underbrace{\begin{bmatrix} y_1^D \\ y_2^D \\ \vdots \\ y_{K-1}^D \\ y_K^D \end{bmatrix}}_{MK \times 1} = \underbrace{\begin{bmatrix} G_{1,1} & G_{1,2} & \cdots & G_{1,L} \\ G_{2,1} & G_{2,2} & & G_{2,L} \\ \vdots & \vdots & \vdots & \vdots \\ G_{K,1} & G_{K,2} & \cdots & G_{K,L} \end{bmatrix}}_{MK \times \sum_{j=1}^{L} N_j} \underbrace{\begin{bmatrix} W_1 & & & \\ & W_2 & & \\ & & \ddots & \\ & & & W_L \end{bmatrix}}_{\sum_{j=1}^{L} N_j \times \sum_{j=1}^{L} N_j}$$ [Equation 7]

$$\underbrace{\begin{bmatrix} H_{1,1} & H_{1,2} & \cdots & H_{1,K} \\ H_{2,1} & H_{2,2} & & H_{2,K} \\ \vdots & \vdots & \vdots & \vdots \\ H_{L,1} & H_{L,1} & \cdots & H_{L,k} \end{bmatrix}}_{\sum_{j=1}^{L} N_j \times MK} \underbrace{\begin{bmatrix} x^{[1]} \\ x^{[2]} \\ \vdots \\ x^{[K-1]} \\ x^{[K]} \end{bmatrix}}_{MK \times 1} + \underbrace{\begin{bmatrix} \tilde{n}_1^D \\ \tilde{n}_2^D \\ \vdots \\ \tilde{n}_{K-1}^D \\ \tilde{n}_K^D \end{bmatrix}}_{MK \times 1} =$$

$$\underbrace{\begin{bmatrix} G_{1,1} & G_{1,2} & \cdots & G_{1,L} \\ G_{2,1} & G_{2,2} & & G_{2,L} \\ \vdots & \vdots & \vdots & \vdots \\ G_{K,1} & G_{K,2} & \cdots & G_{K,L} \end{bmatrix}}_{MK \times \sum_{j=1}^{L} N_j} \underbrace{\begin{bmatrix} W_1 & & & \\ & W_2 & & \\ & & \ddots & \\ & & & W_L \end{bmatrix}}_{\sum_{j=1}^{L} N_j \times \sum_{j=1}^{L} N_j}$$

$$\underbrace{\begin{bmatrix} H_{1,1}V^{[1]} & H_{1,2}V^{[2]} & \cdots & H_{1,K}V^{[K]} \\ H_{2,1}V^{[1]} & H_{2,2}V^{[2]} & & H_{2,K}V^{[K]} \\ \vdots & \vdots & \vdots & \vdots \\ H_{L,1}V^{[1]} & H_{L,2}V^{[2]} & \cdots & H_{L,K}V^{[K]} \end{bmatrix}}_{\sum_{j=1}^{L} N_j \times \sum_{k=1}^{K} d_k} \underbrace{\begin{bmatrix} s^{[1]} \\ s^{[2]} \\ \vdots \\ s^{[K-1]} \\ s^{[K]} \end{bmatrix}}_{\sum_{k=1}^{K} d_k \times 1} +$$

$$\underbrace{\begin{bmatrix} \tilde{n}_1^D \\ \tilde{n}_2^D \\ \vdots \\ \tilde{n}_{K-1}^D \\ \tilde{n}_K^D \end{bmatrix}}_{MK \times 1} \underbrace{\begin{bmatrix} G_{1,1} & G_{1,2} & \cdots & G_{1,L} \\ G_{2,1} & G_{2,2} & & G_{2,L} \\ \vdots & \vdots & \vdots & \vdots \\ G_{K,1} & G_{K,2} & \cdots & G_{K,L} \end{bmatrix}}_{\sum_{j=1}^{L} N_j \times \sum_{j=1}^{L} N_j} \underbrace{\begin{bmatrix} W_1 & & & \\ & W_2 & & \\ & & \ddots & \\ & & & W_L \end{bmatrix}}_{\sum_{j=1}^{L} N_j \times \sum_{j=1}^{L} N_j}$$

$$\underbrace{\begin{bmatrix} \tilde{H}_{1,1} & \tilde{H}_{1,2} & \cdots & \tilde{H}_{1,K} \\ \tilde{H}_{2,1} & \tilde{H}_{2,2} & & \tilde{H}_{2,K} \\ \vdots & \vdots & \vdots & \vdots \\ \tilde{H}_{L,1} & \tilde{H}_{L,2} & \cdots & \tilde{H}_{L,K} \end{bmatrix}}_{\sum_{j=1}^{L} N_j \times \sum_{k=1}^{K} d_k} \underbrace{\begin{bmatrix} s^{[1]} \\ s^{[2]} \\ \vdots \\ s^{[K-1]} \\ s^{[K]} \end{bmatrix}}_{\sum_{k=1}^{K} d_k \times 1} + \underbrace{\begin{bmatrix} \tilde{n}_1^D \\ \tilde{n}_2^D \\ \vdots \\ \tilde{n}_{K-1}^D \\ \tilde{n}_K^D \end{bmatrix}}_{MK \times 1}$$

In Equation 7, $\tilde{n}_i^D$ denotes an effective noise vector that is to be received by the $i^{th}$ destination node. In this example, $\tilde{n}_i^D$ may correspond to a sum of a noise amplification at a relay end and a noise at a destination end.

In addition, $\tilde{H}_{l,k}$ denotes a matrix $H_{l,k} V^{[k]}$ of a size of $N_l \times d_k$. In this example, $\tilde{H}_{l,k}$ corresponds to an effective channel for a case in which the $k^{th}$ source node transmits data precoded using a beamforming vector $V^{[k]}$ to the $l^{th}$ relay node.

The relay node may use a block-diagonal matrix to remove interference that affects a predetermined destination node. For example, the interference may be caused by signals transmitted from other source nodes that are not part of the node pair of the corresponding destination node.

For example, the block-diagonal matrix may include a plurality of relay beamforming matrices such as $W_1$, $W_2$, $W_L$, and the like, in a diagonal direction. Here, $W_1$ corresponds to a beamforming matrix for the first relay node, and $W_L$ corresponds to a beamforming matrix for the $l^{th}$ relay node. In this example, elements other than the plurality of relay beamforming matrices may correspond to "0."

Referring to Equation 8, an effective channel of the network may be expressed based on the first channel matrix, the beamforming vector for the source node, the beamforming matrices for the relay nodes, and the second channel matrix.

$$\begin{bmatrix} G_{1,1} & G_{1,2} & \cdots & G_{1,L} \\ G_{2,1} & G_{2,2} & & G_{2,L} \\ \vdots & \vdots & \vdots & \vdots \\ G_{K,1} & G_{K,2} & \cdots & G_{K,L} \end{bmatrix} \begin{bmatrix} W_1 & & & \\ & W_2 & & \\ & & \ddots & \\ & & & W_L \end{bmatrix}$$ [Equation 8]

$$\begin{bmatrix} \tilde{H}_{1,1} & \tilde{H}_{1,2} & \cdots & \tilde{H}_{1,K} \\ \tilde{H}_{2,1} & \tilde{H}_{2,2} & & \tilde{H}_{2,K} \\ \vdots & \vdots & \vdots & \vdots \\ \tilde{H}_{L,1} & \tilde{H}_{L,2} & \cdots & \tilde{H}_{L,K} \end{bmatrix}$$

In this example, referring to Equation 9, the block-diagonal matrix used by the relay node may make or change elements of an off-diagonal block matrix of an effective channel matrix to zero. In this example, the effective channel matrix may be obtained as a result of performing the matrix operation of Equation 8.

Here, the elements of the off-diagonal block matrix of the effective channel matrix corresponding to "0" may indicate that the interference caused by the other source nodes that are not included in a node pair with the predetermined destination node is removed.

$$\begin{bmatrix} G_{1,1} & G_{1,2} & \cdots & G_{1,L} \\ G_{2,1} & G_{2,2} & & G_{2,L} \\ \vdots & \vdots & \vdots & \vdots \\ G_{K,1} & G_{K,2} & \cdots & G_{K,L} \end{bmatrix} \begin{bmatrix} W_1 & & & \\ & W_2 & & \\ & & \ddots & \\ & & & W_L \end{bmatrix}$$ [Equation 9]

$$\begin{bmatrix} \tilde{H}_{1,1} & \tilde{H}_{1,2} & \cdots & \tilde{H}_{1,K} \\ \tilde{H}_{2,1} & \tilde{H}_{2,2} & & \tilde{H}_{2,K} \\ \vdots & \vdots & \vdots & \vdots \\ \tilde{H}_{L,1} & \tilde{H}_{L,2} & \cdots & \tilde{H}_{L,K} \end{bmatrix} = \begin{bmatrix} \Delta_1 & & & \\ & \Delta_2 & & \\ & & \ddots & \\ & & & \Delta_L \end{bmatrix}$$

Conditional expressions to be used for satisfying Equation 9 at the first destination node are expressed by Equation 10.

$$G_{1,1} W_1 \tilde{H}_{1,2} + G_{1,2} W_2 \tilde{H}_{2,2} + \ldots + G_{1,L} W_L \tilde{H}_{L,2} = 0_{M \times d_2}$$ [Equation 10]

$$G_{1,1} W_1 \tilde{H}_{1,3} + G_{1,2} W_2 \tilde{H}_{2,3} + \ldots + G_{1,L} W_L \tilde{H}_{L,3} = 0_{M \times d_3}$$

$$\vdots$$

$$G_{1,1} W_1 \tilde{H}_{1,K} + G_{1,2} W_2 \tilde{H}_{2,K} + \ldots + G_{1,L} W_L \tilde{H}_{L,K} = 0_{M \times d_K}$$

In addition, conditional expressions to be used for satisfying Equation 9 at the second destination node are expressed by Equation 11.

$$G_{2,1}W_1\tilde{H}_{1,1} + G_{2,2}W_2\tilde{H}_{2,1} + \ldots + G_{2,L}W_L\tilde{H}_{L,1} = 0_{M \times d_1}$$
$$G_{2,1}W_1\tilde{H}_{1,3} + G_{2,2}W_2\tilde{H}_{2,3} + \ldots + G_{2,L}W_L\tilde{H}_{L,3} = 0_{M \times d_3}$$
$$\vdots$$
$$G_{2,1}W_1\tilde{H}_{1,K} + G_{2,2}W_2\tilde{H}_{2,K} + \ldots + G_{2,L}W_L\tilde{H}_{L,K} == 0_{M \times d_K}$$

[Equation 11]

Further, conditional expressions to be used for satisfying Equation 9 at the $k^{th}$ destination node are expressed by Equation 12.

$$G_{K,1}W_1\tilde{H}_{1,1} + G_{K,2}W_2\tilde{H}_{2,1} + \ldots + G_{K,L}W_L\tilde{H}_{L,1} = 0_{M \times d_1}$$
$$G_{K,1}W_1\tilde{H}_{1,2} + G_{K,2}W_2\tilde{H}_{2,2} + \ldots + G_{K,L}W_L\tilde{H}_{L,2} = 0M \times d_2$$
$$\vdots$$
$$G_{K,1}W_1\tilde{H}_{1,K-1} + G_{K,2}W_2\tilde{H}_{2,K-1} + \ldots + G_{K,L}W_L\tilde{H}_{L,K-1} =$$
$$0_{M \times d_{K-1}}$$

[Equation 12]

In this example, Equations 10 through 12 may be expressed by Equations 13 through 15, respectively, using a Kronecker product, a characteristic of a column vector stacking operation related to $\otimes$, and vec(AXB)=($B^T \otimes$ A)vec(X).

$$F_{1,1,2}w_1 + F_{1,2,2}w_2 + \ldots + F_{1,L,2}w_L = 0_{Md_2 \times 1}$$
$$F_{1,1,3}w_1 + F_{1,2,3}w_2 + \ldots + F_{1,L,3}w_L = 0_{Md_3 \times 1}$$
$$\vdots$$
$$F_{1,1,K}w_1 + F_{1,2,K}w_2 + \ldots + F_{1,L,K}w_L = 0_{Md_K \times 1}$$

[Equation 13]

$$F_{2,1,1}w_1 + F_{2,2,1}w_2 + \ldots + F_{2,L,1}w_L = 0_{Md_1 \times 1}$$
$$F_{2,1,3}w_1 + F_{2,2,3}w_2 + \ldots + F_{2,L,3}w_L = 0_{Md_3 \times 1}$$
$$\vdots$$
$$F_{2,1,K} + F_{2,2,K}w_2 + \ldots + F_{2,L,K}w_L = 0_{Md_K \times 1}$$

[Equation 14]

$$F_{K,1,1}w_1 + F_{K,2,1}w_2 + \ldots + F_{K,L,1}w_L = 0_{Md_1 \times 1}$$
$$F_{K,1,2}w_1 + F_{K,2,2}w_2 + \ldots + F_{K,L,2}w_L = 0_{Md_2 \times 1}$$
$$\vdots$$
$$F_{K,1,K-1}w_1 + F_{K,2,K-1}w_2 + \ldots + F_{K,L,K-1}w_L = 0_{Md_{K-1} \times 1}$$

[Equation 15]

Here, $F_{j,k,i} = \tilde{H}^T_{k,i} \otimes G_{j,k}$. $F_{j,k,i}$ denotes an effective channel that has a size of $d_i M \times N_k^2$ from the $i^{th}$ source node through the $k^{th}$ relay node to the $j^{th}$ destination node.

In addition, $w_k = \text{vec}(W_k)$ denotes a vector representation that is generated by performing the column vector stacking operation on the relay beamforming matrix $W_k$.

A condition for obtaining the relay beamforming matrices, for example, $W_1$, $W_2$, $W_L$, and the like, that satisfies each of Equation 13 through Equation 15 is expressed by Equation 16.

$$\begin{bmatrix} F_{1,1,2} & F_{1,2,2} & \ldots & F_{1,L,2} \\ F_{1,1,3} & F_{1,2,3} & \ldots & F_{1,L,3} \\ \vdots & \vdots & & \vdots \\ F_{1,1,K} & F_{1,2,K} & \ldots & F_{1,L,K} \\ F_{2,1,1} & F_{2,2,1} & \ldots & F_{2,L,1} \\ F_{2,1,3} & F_{2,2,3} & \ldots & F_{2,L,3} \\ \vdots & \vdots & & \vdots \\ F_{2,1,K} & F_{2,2,K} & \ldots & F_{2,L,K} \\ \vdots & \vdots & \vdots & \vdots \\ F_{K,1,1} & F_{K,2,1} & & F_{K,L,1} \\ F_{K,1,2} & F_{K,2,2} & & F_{K,L,2} \\ \vdots & \vdots & & \vdots \\ F_{K,1,K-1} & F_{K,2,K-1} & & F_{K,L,K-1} \end{bmatrix} \begin{bmatrix} w_1 \\ w_2 \\ \vdots \\ w_L \end{bmatrix} = \begin{bmatrix} 0_{Md_2 \times 1} \\ 0_{Md_2 \times 1} \\ \vdots \\ 0_{Md_K \times 1} \\ 0_{Md_1 \times 1} \\ 0_{Md_3 \times 1} \\ \vdots \\ 0_{Md_K \times 1} \\ \vdots \\ 0_{Md_1 \times 1} \\ 0_{Md_2 \times 1} \\ \vdots \\ 0_{Md_{K-1} \times 1} \end{bmatrix}$$

$$\underbrace{}_{M(K-1)\sum_i^K d_i \times \sum_{j=1}^L N_k^2}$$

$$= \bar{F}_{K \times L \times K} \bar{w}$$
$$= 0_{M(K-1)\sum_i^K d_i \times 1}$$

[Equation 16]

In this instance, a solution of $\bar{w}$ may be obtained using Equation 17.

$$\bar{w} \in \text{null}(\bar{F}_{K \times L \times K})$$

[Equation 17]

In Equation 17, null(A) denotes a null space of a matrix A. The null space of the matrix A corresponds to a set of all vectors y that satisfy a condition Ay=0.

In this instance, a condition under which the solution of $\bar{w}$ exists may be expressed by Equation 18.

$$M(K-1)\sum_{i=1}^K d_i + 1 \leq \sum_{j=1}^L N_j^2 \Leftrightarrow \sum_{i=1}^K d_i \leq \left\lfloor \frac{\sum_{j=1}^L N_j^2 - 1}{M(K-1)} \right\rfloor$$

[Equation 18]

Example of Reception Scheme of Plurality of Destination Nodes

A destination node may combine data based on a precoding scheme used by a source node that forms a node pair with the corresponding destination node.

According to various aspects, relay nodes may remove interference caused by remaining source nodes that are not included in respective node pairs. Accordingly, the destination node may remove interference occurring in received signals when a MIMO antenna is used, thereby obtaining desired data. For example, the destination node may remove interference caused by the MIMO antenna, based on a combining scheme corresponding to a precoding scheme used by a source node forming a pair with the corresponding destination node.

Figure 2:
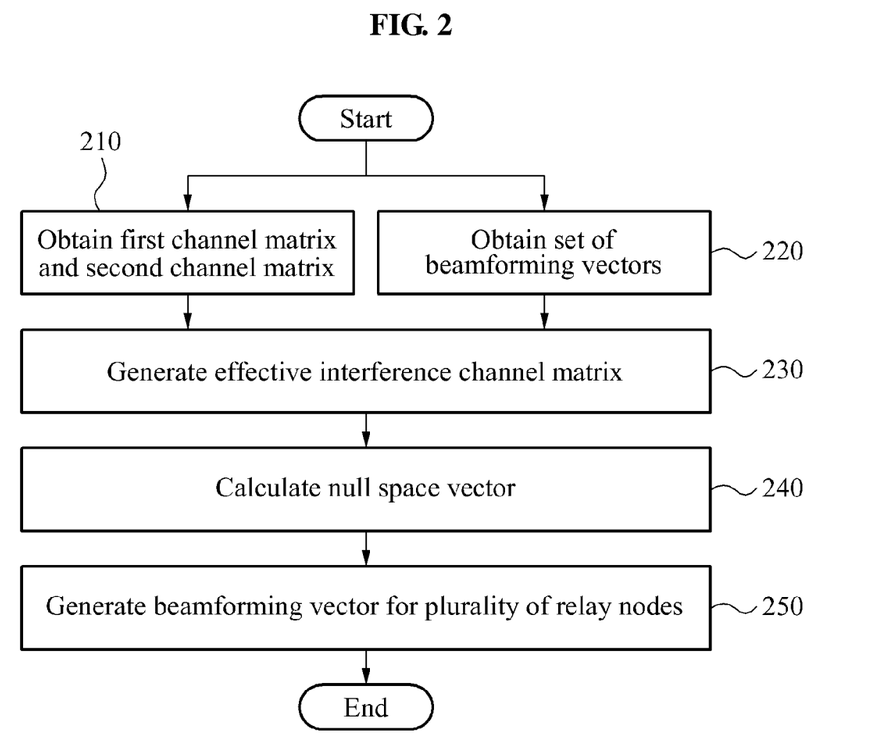
Figure 3A:
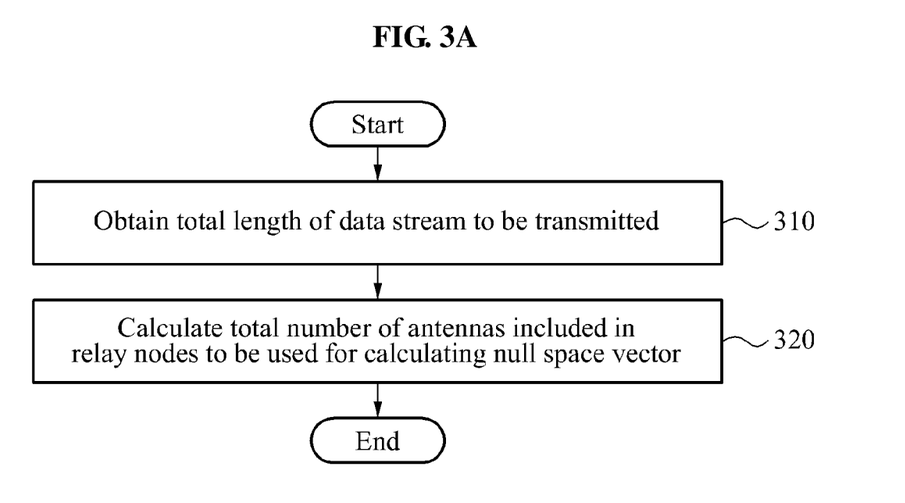
Figure 3B:
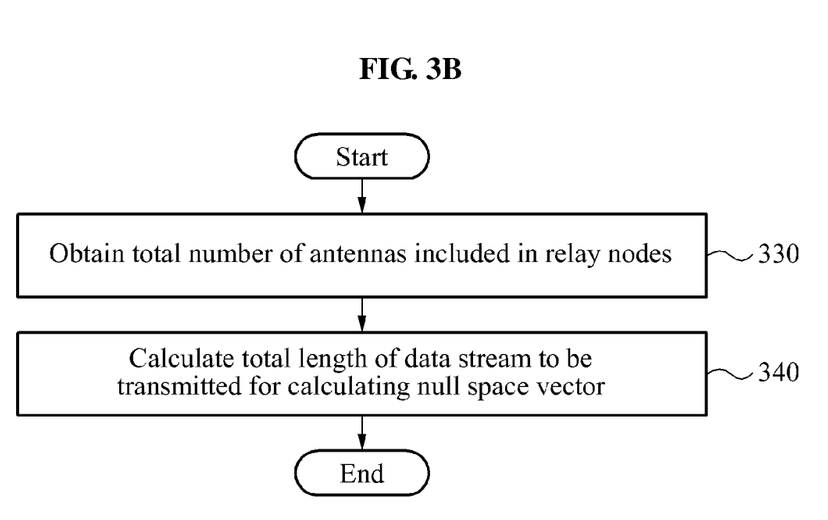

FIGS. 2 through 3B illustrate examples of a method of relaying data among a plurality of node pairs using a plurality of relay nodes.

Referring to FIG. 2, in 210, a first channel matrix and a second channel matrix are obtained. In 230, an effective interference channel matrix is generated. In 240, a null space vector is calculated.

For example, when a first source node among a plurality of source nodes desires to transmit data to a first destination node among a plurality of destination nodes, the first source node and the first destination node may form a pair.

In this example, the first channel matrix may correspond to a matrix, for example, a matrix H, expressing a channel between a plurality of source antennas and a plurality of relay antennas. Furthermore, the second channel matrix may correspond to a matrix, for example, a matrix G, expressing a channel between the plurality of relay antennas and a plurality of destination antennas.

In addition, in 230, the effective interference channel matrix may be calculated, based on the first channel matrix and the second channel matrix. For example, the effective interference channel matrix may include effective channels between antennas of the first source node and antennas of remaining destination nodes that are not part of the node pair with the first source node. The effective interference channel matrix may include an effective channel associated with a data transmission path from each antenna of the first source node through each relay antenna to each antenna of destination nodes that are not part of the node pair of the first source node. For example, referring to Equation 16, the to effective interference channel matrix may correspond to a matrix $\bar{F}_{K \times L \times K}$ of a size of $$M(K-1) \sum_{i}^{K} d_i \times \sum_{j=1}^{L} N_k^2.$$

Although not shown in FIG. 2, in 230, an interference pair of a source node and a destination node that are excluded from a plurality of node pairs may be obtained. Also, a channel matrix between antennas of the source node included in the interference pair and antennas of one of the plurality of relay nodes may be transposed, and a Kronecker product of the transposed channel matrix and a channel matrix between the antennas of one of the plurality of relay nodes and antennas of the destination node included in the interference pair may be calculated.

In 240, at least one null space vector included in a null space of an effective interference channel matrix and may be calculated. Here, a null space vector may refer to a vector that is not a zero vector, among a plurality of vectors included in the null space of the effective interference channel matrix. For example, referring to Equation 16, the null space vector may correspond to the vector $\bar{w}$ including a $$\sum_{j=1}^{L} N_k^2$$

number of elements.

In 250, a beamforming matrix for the plurality of relay nodes is generated based on the null space vector. For example, L number of relay beamforming matrices such as $W_1, W_2, W_L$, and the like, may be generated from the vector $\bar{w}$ including the $$\sum_{j=1}^{L} N_k^2$$

number of elements. For example, each of the relay beamforming matrices may have a size of $N_k \times N_k$. In addition, a block-diagonal matrix including the plurality of relay beamforming matrices, for example, $W_1, W_2, W_L$, and the like, in a diagonal direction may be generated.

As another example, in 220, a set of beamforming vectors to be used by the plurality of source nodes is obtained. In this example, in 230, the effective interference channel matrix may be calculated based on the first channel matrix, the second channel matrix, and the set of the beamforming vectors.

For example, in 230, an interference pair that includes a source node and a to destination node excluded from the plurality of node pairs may be obtained. A channel matrix between antennas of the source node included in the interference pair and antennas of one of the plurality of relay nodes may be multiplied by a beamforming vector used by the source node included in the interference pair. The multiplied channel matrix may be transposed, and a Kronecker product of the transposed channel matrix and a channel matrix between the antennas of one of the plurality of relay nodes and antennas of the destination node included in the interference pair may be calculated.

Referring to FIG. 3A, in 310, a total length of data streams to be transmitted by the plurality of source nodes is obtained. In 320, a total number of antennas included in the plurality of relay nodes to be used for calculating the null space vector is calculated based on the total length of the data streams. For example, a total number of relay antennas to be used may be calculated based on the total length of the data streams to be transmitted, using Equation 18.

Referring to FIG. 3B, in 330, a total number of antennas included in the plurality of relay nodes is obtained. In 340, a total length of data streams to be transmitted by the plurality of source nodes for calculating the null space vector is calculated based on the total number of the antennas. In this example, the total length of the data streams to be transmitted may be calculated based on the number of the relay antennas, using Equation 18.

Figure 4:
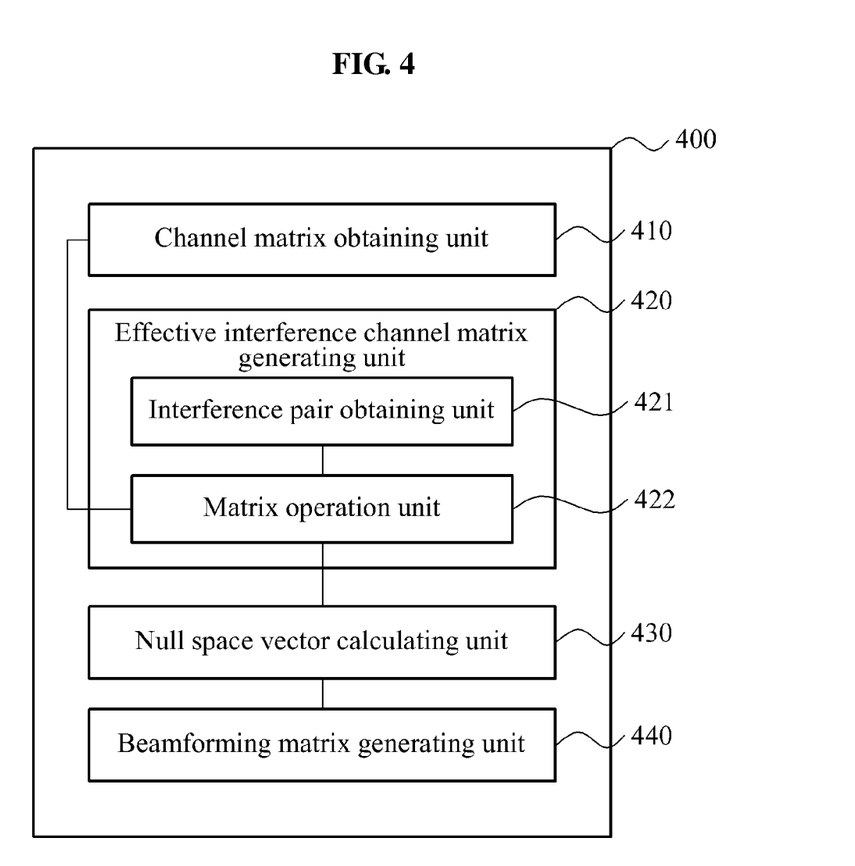
FIG. 4 is a diagram illustrating an example of a system for relaying data among a plurality of node pairs using a plurality of relay nodes.

FIG. 4 illustrates an example of a system 400 for relaying data among a plurality of node pairs using a plurality of relay nodes. Here, the system 400 may be an apparatus or a device, such as a terminal, a base station, a relay node, a source node, a destination node, and the like. The system 400 may be included in a single apparatus or device or may be spread over multiple apparatuses or devices.

Referring to FIG. 4, the system 400 includes a channel matrix obtaining unit 410, an effective interference channel matrix generating unit 420, and a null space vector calculating unit 430. The channel matrix obtaining unit 410 may obtain a first channel matrix and a second channel matrix. The effective interference channel matrix generating unit 420 may generate an effective interference channel matrix based on the first channel matrix and the second channel matrix. The null space vector calculating unit 430 may calculate a null space vector of the effective interference channel matrix.

In this example, the effective interference channel matrix generating unit 420 includes an interference pair obtaining unit 421 and a matrix operation unit 422. The interference pair obtaining unit 421 may obtain an interference pair of a source node and a destination node excluded from a plurality of node pairs. The matrix operation unit 422 may transpose a channel matrix between antennas of the source node included in the interference pair and antennas of one of the plurality of relay nodes. The matrix operation unit 422 may calculate a Kronecker product of the transposed channel matrix and a channel matrix between the antennas of one of the plurality of relay nodes and antennas of the destination node included in the interference pair.

As another example, the system 400 may further include a beamforming vector set obtaining unit (not shown) that may obtain a set of beamforming vectors to be used by a plurality of source nodes. In this example, the effective interference channel matrix generating unit 420 may calculate the effective interference channel matrix based on the first channel matrix, the second channel matrix, and the set of the beamforming vectors. The matrix operation unit 422 may multiply a channel matrix between antennas of the source node included in the interference pair and antennas of one of the plurality of relay nodes by a beamforming vector that is to be used by the source node included in the interference pair. The matrix operation unit 422 may transpose the multiplied channel matrix, and calculate a Kronecker product of the transposed channel matrix and a channel matrix between the antennas of one of the plurality of relay nodes and antennas of the destination node included in the interference pair.

The system 400 further includes a beamforming matrix generating unit 440. The beamforming matrix generating unit 440 may generate a beamforming matrix for the plurality of relay nodes, based on the null space vector.

According to various aspects, provided is a technology for controlling interference between data streams when data is to be transmitted from a plurality of source nodes through a plurality of relay node to a plurality of destination nodes, and may be applied to various scenarios. For example, the examples herein may be applied to a plurality of base stations that transmit data to multiple users positioned at a cell boundary, through a plurality of relay devices in a cellular system.

As another example, the present description may be applied to an example in which multiple users transmit data to respective destination devices through a plurality of relay devices over an ad-hoc network.

It should also be appreciated that the description provided with reference to FIGS. 1 through 3B may be applied to the elements shown in FIG. 4 and thus, a repeated description will be omitted here for conciseness.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of relaying data among node pairs using relay nodes, the method comprising:
    obtaining a first channel matrix between antennas related to source nodes and antennas related to the relay nodes;
    obtaining a second channel matrix between the antennas related to the relay nodes and antennas related to destination nodes;
    generating an effective interference channel matrix based on the first channel matrix and the second channel matrix;
    wherein the generating comprises:
    obtaining an interference pair comprising a source node and a destination node that are excluded from the node pairs;
    transposing a channel matrix between antennas of the source node related to the interference pair and antennas of one of the relay nodes; and
    calculating a Kronecker product of the transposed channel matrix and a channel matrix between the antennas of one of the relay nodes and antennas of the destination node related to the interference pair; and
    calculating at least one null space vector included in a null space of the effective interference channel matrix where the null space vector is not a zero vector.

2. The method of claim 1, further comprising:
    obtaining a set of beamforming vectors to be used by the source nodes,
    wherein the generating comprises calculating the effective interference channel matrix based on the first channel matrix, the second channel matrix, and the set of the beamforming vectors.

3. The method of claim 2, wherein the generating comprises:
    obtaining an interference pair comprising a source node and a destination node that are excluded from the node pairs;
    multiplying a channel matrix between antennas of the source node related to the interference pair and antennas of one of the relay nodes by a beamforming vector to be used by the source node included in the interference pair;
    transposing the multiplied channel matrix; and calculating a Kronecker product of the transposed channel matrix and a channel matrix between the antennas of one of the relay nodes and antennas of the destination node related to the interference pair.

4. The method of claim 1, wherein the effective interference channel matrix comprises effective channels between antennas of a first source node and antennas of remaining destination nodes that are not part of the node pair of the first source node.

5. The method of claim 1, wherein the effective interference channel matrix comprises an effective channel associated with a data transmission path from each antenna of a first source node through each antenna of the relay nodes to each antenna of remaining destination nodes that are not part of the node pair of the first source node.

6. The method of claim 1, further comprising:
generating a beamforming matrix for the relay nodes based on the at least one null space vector.

7. The method of claim 1, wherein a first source node is configured to precode the data based on a predetermined precoding scheme using multiple antennas, and a first destination node is configured to combine the data based on an interference cancellation scheme corresponding to the predetermined precoding scheme.

8. The method of claim 1, wherein the relay nodes comprise a first relay node and a second relay node, and a number of antennas related to the first relay node differs from a number of antennas related to the second relay node.

9. The method of claim 1, wherein the source nodes comprise a first source node and a second source node, and a length of a data stream to be transmitted by the first source node differs from a length of a data stream to be transmitted by the second source node.

10. The method of claim 1, further comprising:
obtaining a total length of data streams that are to be transmitted by the source nodes; and
calculating a total number of antennas of the relay nodes that are to be used for calculating the null space vector, based on the total length of the data streams.

11. The method of claim 1, further comprising:
obtaining a total number of antennas of the relay nodes; and
calculating, based on the total number of the antennas, a total length of data streams to be transmitted by the source nodes to calculate the null space vector.

12. A non-transitory computer-readable medium comprising a program for instructing a computer to perform the method of claim 1.

13. An apparatus for relaying data among node pairs using relay nodes, the apparatus comprising:
a channel matrix obtainer processor configured to obtain a first channel matrix between antennas included in source nodes and antennas related to the relay nodes, and to obtain a second channel matrix between the antennas related to the relay nodes and antennas related to destination nodes;
an effective interference channel matrix generator processor configured to generate an effective interference channel matrix based on the first channel matrix and the second channel matrix;
wherein the effective interference channel matrix generator processor comprises:
an interference pair obtainer processor configured to obtain an interference pair of a source node and a destination node that are excluded from the node pairs; and
a matrix operation processor configured to transpose a channel matrix between antennas of the source node related to the interference pair and antennas of one of the relay nodes, and to calculate a Kronecker product of the transposed channel matrix and a channel matrix between the antennas of the one of the relay nodes and antennas of the destination node related to the interference pair; and
a null space vector calculator processor configured to calculate a null space vector related to a null space of the effective interference channel matrix where the null space vector is not a zero vector.

14. The apparatus of claim 13, further comprising:
a beamforming vector set obtainer processor configured to obtain a set of beamforming vectors to be used by the source nodes,
wherein the effective interference channel matrix generating procesor is configured to calculate the effective interference channel matrix based on the first channel matrix, the second channel matrix, and the set of the beamforming vectors.

15. The apparatus of claim 14, wherein the effective interference channel matrix generator processor comprises:
an interference pair obtainer processor configured to obtain an interference pair of a source node and a destination node that are excluded from the node pairs; and
a matrix operation processor configured to multiply a channel matrix between antennas of the source node related to the interference pair and antennas of one of the relay nodes by a beamforming vector to be used by the source node related to the interference pair, to transpose the multiplied channel matrix, and to calculate a Kronecker product of the transposed channel matrix and a channel matrix between the antennas of one of the relay nodes and antennas of the destination node related to the interference pair.

16. The apparatus of claim 13, further comprising:
a beamforming matrix generator processor configured to generate a beamforming matrix for the relay nodes based on the null space vector.

17. The apparatus of claim 13, wherein the first source node is configured to precode the data based on a predetermined precoding scheme using multiple antennas, and the first destination node is configured to combine the data based on an interference cancellation scheme corresponding to the predetermined precoding scheme.

18. The apparatus of claim 13, wherein,
the relay nodes comprises a first relay node and a second relay node, and a number of antennas related to the first relay node differs from a number of antennas related to the second relay node, and
the source nodes comprise a first source node and a second source node, and a length of a data stream to be transmitted by the first source node differs from a length of a data stream to be transmitted by the second source node.

19. A method of relaying data among node pairs using relay nodes, the method comprising:
obtaining a first channel matrix between antennas related to source nodes and antennas related to the relay nodes;
obtaining a second channel matrix between the antennas related to the relay nodes and antennas related to destination nodes;
obtaining a set of beamforming vectors to be used by the source nodes;
obtaining an interference pair comprising a source node and a destination node that are excluded from the node pairs;
generating an effective interference channel matrix based on the first channel matrix and the second channel matrix;

wherein the generating comprises calculating the effective interference channel matrix based on the first channel matrix, the second channel matrix, and the set of the beamforming vectors;

multiplying a channel matrix between antennas of the source node related to the interference pair and antennas of one of the relay nodes by a beamforming vector to be used by the source node included in the interference pair;

transposing the multiplied channel matrix;

calculating a Kronecker product of the transposed channel matrix and a channel matrix between the antennas of one of the relay nodes and antennas of the destination node related to the interference pair; and calculating at least one null space vector included in a null space of the effective interference channel matrix where the null space vector is not a zero vector.

20. An apparatus for relaying data among node pairs using relay nodes, the apparatus comprising:

a channel matrix obtainer processor configured to obtain a first channel matrix between antennas included in source nodes and antennas related to the relay nodes, and to obtain a second channel matrix between the antennas related to the relay nodes and antennas related to destination nodes;

a beamforming vector set obtainer processor configured to obtain a set of beamforming vectors to be used by the source nodes, an effective interference channel matrix generator processor configured to generate an effective interference channel matrix based on the first channel matrix and the second channel matrix;

wherein the effective interference channel matrix generating processor is configured to calculate the effective interference channel matrix based on the first channel matrix, the second channel matrix, and the set of the beamforming vectors wherein the effective interference channel matrix generator processor comprises:

an interference pair obtainer processor configured to obtain an interference pair of a source node and a destination node that are excluded from the node pairs; and a matrix operation processor configured to multiply a channel matrix between antennas of the source node related to the interference pair and antennas of one of the relay nodes by a beamforming vector to be used by the source node related to the interference pair, to transpose the multiplied channel matrix, and to calculate a Kronecker product of the transposed channel matrix and a channel matrix between the antennas of one of the relay nodes and antennas of the destination node related to the interference pair; and a null space vector calculator processor configured to calculate a null space vector related to a null space of the effective interference channel matrix where the null space vector is not a zero vector.

* * * * *